Oct. 1, 1957   R. R. MICKUS ET AL   2,808,333
RICE TREATING PROCESS
Filed Nov. 9, 1953
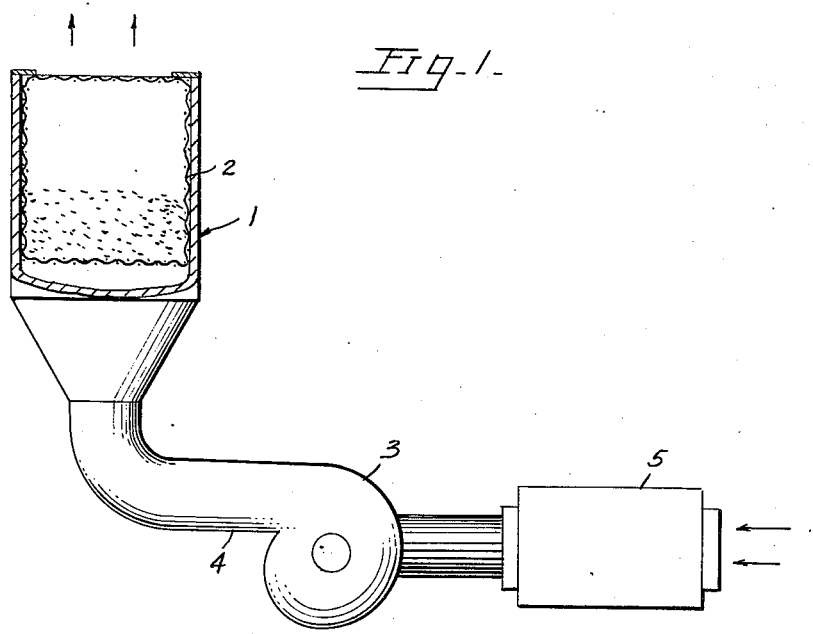
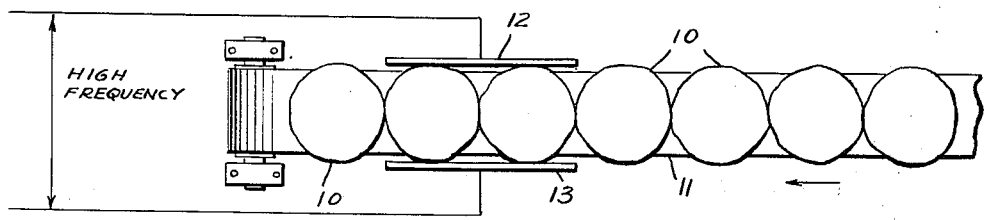
INVENTOR.
ROBERT R. MICKUS
GEORGE W. BREWER
BY
Boykin, Mobley & Beckley.

United States Patent Office 2,808,333
Patented Oct. 1, 1957

2,808,333

RICE TREATING PROCESS

Robert R. Mickus and George W. Brewer, Sacramento, Calif., assignors to Rice Growers Association of California Application November 9, 1953, Serial No. 390,923

7 Claims (Cl. 99—80)

This invention relates to the treating of rice and has for its main object the provision of a method for improving the quality of uncooked rice and at the same time reducing the cooking time required to render the rice edible.

Generally speaking, untreated rice requires cooking for at least 30 minutes to render the same soft and palatable. Several different processes have been evolved in the past to reduce cooking time to about 10 minutes, but such processes have not resulted in any improvement in the product and result in a considerable increase in cost.

The present invention contemplates, not only reduction of cooking time by the consumer to one minute or less, but also a considerable improvement in the nutritive quality of the rice.

A desirable step in practicing the present invention is that of parboiling. Parboiling considerably improves the nutritive qualities of rice and comprises, generally, soaking the rough rice paddy in water (preferably hot) and subsequently steaming the rice at about 250° F. for from 15 minutes to an hour. Thereafter, the rice is permitted to dry until its normal moisture content of about 14% is reached.

Many advantages of parboiled rice have been cited in the past, among which are: (1) Breakage in the subsequent milling process is reduced, thus improving the yield of high quality kernels from about 48% to 72%. (2) The rice is given a distinctive flavor which is preferred by some. (3) Certain soluble nutritive elements are transferred from the bran and germ which surrounds the endosperm, into the latter, thus improving the food value of the product and making it more sustaining. (4) The rice keeps better before and after cooking. (5) Insect infestation is removed by parboiling.

A characteristic of parboiling is that it changes the appearance from a white and more or less opaque, to a nearly translucent and amber color. This change of appearance, although of no moment in itself, makes it undesirable to some buyers. By the present invention the rice, after parboiling, is returned to its white opaque color.

Another disadvantage of untreated parboiled rice lies in the fact that the parboiling process extends the required cooking time. Thus, whereas ordinary milled rice may require cooking for 15 minutes, the same rice, if parboiled, must be cooked for about 30 minutes to make it edible. This characteristic of parboiled rice is believed to be due to the fact that ordinary rice has a rather loose starch structure while parboiling tends to cause a tight starch structure.

One of the main objects of the present invention is the reduction of the cooking time of parboiled rice. By the present invention the necessary cooking time is reduced far below that now required for ordinary rice.

The present invention therefore contemplates the inclusion of all advantages of parboiling and the elimination of its disadvantages. It is important to note in this connection that parboiling results in the incorporation of certain desirable elements from the bran of the rice paddy which, by conventional milling processes, are entirely removed with the bran. It will be understood, of course, that parboiling is accomplished while the endosperm is still protected by the hull and no physical injury to the endosperm results from the parboiling step. On the contrary, as pointed out above, breakage of the rice kernels during the milling process is reduced by the previous parboiling step, thus enhancing the value of the yield.

By the present invention, milled parboiled rice is heated in a dry condition and after the rice has reached its normal moisture content of about 14%. Such heating has the effect of accelerating the breakdown of the starch structure of the rice which is started by the parboiling step.

There are several different ways in which the dry heating step may be performed. One procedure which has been employed successfully is to circulate rapidly moving hot air around the rice kernels at a temperature of from 300 to 500° F. If the exposure of the rice to the hot air at the above temperature is continued for a period of from 30 to 60 seconds, it has been found that the resultant product may be completely cooked in a minute or less. It is interesting to note that if this dry heating step is performed on ordinary rice which has not been parboiled, no change in the rice is apparent and no reduction in the subsequent cooking time is effected.

The apparatus for carrying out the above step may take various forms, but we have successfully employed a vertically extending conduit generally designated 1 (Fig. 1) in which a basket 2 of wire mesh may be inserted for supporting the rice within the path of the air flow through the conduit 1. A blower 3 is provided for conducting air through a pipe 4 into the lower end of conduit 1. Before reaching the blower 3 the air may be heated to the required temperature by means of any conventional type of heater 5.

It is desirable that the dry heating step be done quickly, and for this reason it is preferable not to insert the rice into the air stream until the air from heater 5 has been raised to the desired temperature. Naturally the time required depends on the temperature of the air, but, as stated above, the time may be made as low as 30 seconds if the air temperature is around 500° F., and if the temperature is reduced to about 300° F., the time may run as high as 60 seconds.

An important advantage of the above described method of heating the rice lies in the fact that insects and their larvae may be blown completely out of the body of rice in addition to being killed by the elevated temperature.

If the level is substantially lower than 300° F. no appreciable change in the rice takes place and no practical reduction in cooking time results.

Another method of carrying out the dry heating step is by dielectric heating whereby the rice is made the dielectric between a pair of opposedly facing plates acting as a capacitor. This method is schematically illustrated in Fig. 2 wherein the rice is placed in bags 10 supported on a conveyor belt 11 for movement between a pair of plates 12, 13 respectively. The plates 12 are connected to a source of high frequency alternating current such as a vacuum tube oscillator so that a dielectric heating effect is imposed on the rice.

The advantage of this procedure is that rice may be weighed and sealed in the bags or cartons before the heating process, provided enough space is left in the bags for expansion of the kernels.

Furthermore, inasmuch as dielectric heating results in the interior of the rice heating first, the final temperature need not be as high as in hot air heating. Thus, it has been found that when the temperature of the rice reaches 150° to 180° F. its condition is the same as when heated by means of hot air at 300° F. to 500° F. as described above.

Although it will be apparent that dielectric heating involves many variables, any one of which may be changed as desired, we have found that by using various frequencies between one and thirty megacycles with a power input of 1.8 kw. an exposure of about 30 seconds is all that is required to break down the starch structure so that the rice may be cooked in less than one minute. In the above apparatus the plate area and plate spacing were such that the temperature of the rice was raised to between 150° F. and 180° F. in about 30 seconds.

The above description assumes a relatively light weight package such as cellophane. With heavier containers made of cardboard or the like a greater amount of energy must be employed or the exposure time lengthened.

The present invention is particularly applicable to the processing of rice for making breakfast cereals and the like. Such rice cereals have, heretofore, been puffed or exploded by various complicated operations to make the kernels edible without further cooking. Although parboiled rice is desirable for use in such processes because of its high nutritive values, it has been customary in the past to employ only white milled rice since the amber color of parboiled rice was believed to make it undesirable.

By the present invention such puffed products may be made with less expensive equipment by using parboiled rice because the dry heating step returns the rice kernel to its original whiteness. To puff the rice it is merely necessary to continue the heating step beyond that described above.

By the present invention an extremely desirable product may also be made from broken rice kernels which heretofore have been considered of little value and have brought relatively low prices compared with whole kernels.

As noted above, when the dry parboiled rice is heated in a dry atmosphere, the endosperm swells in volume although no puffing effect results in the temperature ranges described. If the dry heating step is performed on irregular shaped broken kernels, the broken pieces, which normally have relatively sharp edges, tend to round out when they swell and approach a spherical shape which gives them an attractive appearance. Although such broken kernels are, of course, much smaller than whole kernels, they may be packaged as quick cooking rice and make an attractive package.

If desired, the dry heated rice may be eaten without any additional cooking and makes a particularly tasty breakfast cereal especially if sugar and cream is added.

Thus, whether the whole kernels or broken kernels are used, the above described process produces either a quick cooking rice if prepared in the conventional manner or a ready-to-eat product having a high nutritive value.

In addition, the processed rice may be crushed or ground into relatively small particles and employed as a baby food, in which case the addition of warm water is all that is required to render the same edible by the child.

It is pertinent to note that the rice swells in size by the above described dry heating steps and such swelling may be from twenty-five percent to three or four hundred percent without puffing. However, when cooked by the consumer in the usual manner for a minute or less, the rice shrinks in size so that the final product cannot be distinguished from ordinary cooked white milled rice, although its nutritive value is considerably greater.

The above specifically described methods of treating the rice are not to be understood as restrictive of the invention, but merely as preferred modes of carrying it out. Obviously variations of the above processes are possible without departing from the invention as defined in the following claims.

We claim:

1. The method of tenderizing parboiled milled rice to reduce the cooking time thereof comprising the step of heating said rice by circulating dry air at a temperature from 300° F. to 500° F. therearound.

2. The method of tenderizing parboiled milled rice to reduce the cooking time thereof comprising the step of circulating dry air therearound at a temperature of from 350–500° F. for a period of from 30 to 120 seconds.

3. The method of treating rice to reduce its cooking time to about one minute comprising the steps of: parboiling and milling the rice, drying said rice and heating the same to a temperature of from 125 to 200° F. by means of dielectric heating.

4. The method of treating rice to reduce its cooking time to about one minute comprising the steps of: parboiling and milling the rice, and thereafter placing said rice in an alternating electric field until its temperature is between 125° F. and 200° F.

5. The method of making a baby food adapted to be rendered edible by the addition of hot water comprising the steps of: heating parboiled milled rice in a dry atmosphere to a temperature of from 300° to 500° F. to cause the volume of said rice to expand at least 25% and thereafter crushing said rice into relatively fine particles.

6. The method of tenderizing parboiled milled rice and simultaneously ridding the same of insect infestation comprising the steps of: subjecting the rice to a blast of hot air at a temperature of from 300° to 500° F.

7. The method of tenderizing parboiled milled rice comprising the step of heating the rice in a dry atmosphere at a temperature between 300° F. and 500° F. until the same increases of volume about 25%.

References Cited in the file of this patent

UNITED STATES PATENTS

| | | |
|---|---|---|
| 1,239,555 | Baumgartner | Sept. 11, 1917 |
| 2,064,522 | Davis | Dec. 15, 1936 |
| 2,515,409 | Jones et al. | July 18, 1950 |
| 2,585,978 | Van Atta et al. | Feb. 19, 1952 |
| 2,610,124 | Roberts | Sept. 9, 1952 |